Nov. 21, 1933.  O. M. URBAIN  1,935,961
METHOD OF INCREASING EFFICIENCY OF ADSORBENTS
Filed July 29, 1931
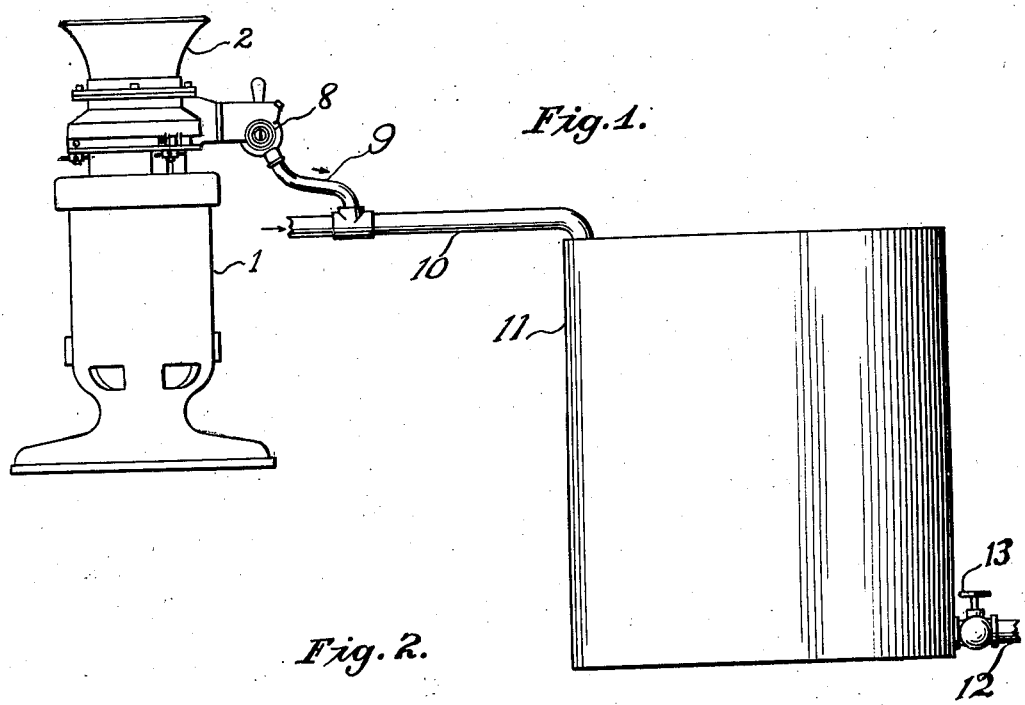
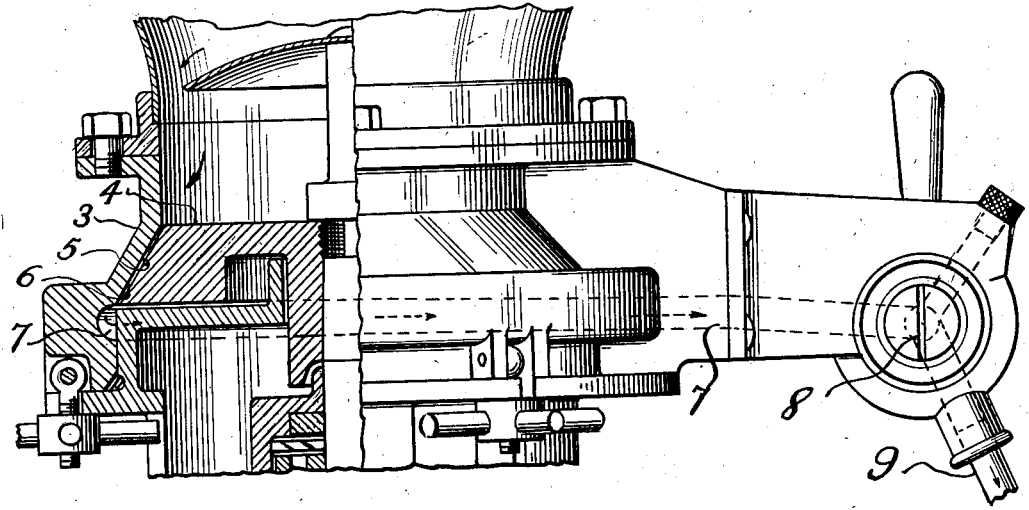
Inventor
Oliver M. Urbain
By James P. Burns
Attorney Patented Nov. 21, 1933

1,935,961

UNITED STATES PATENT OFFICE 1,935,961

METHOD FOR INCREASING EFFICIENCY OF ADSORBENTS

Oliver M. Urbain, Columbus, Ohio, assignor to Charles H. Lewis, Harpster, Ohio

Application July 29, 1931. Serial No. 553,903

2 Claims. (Cl. 252—2)

This invention relates to a method of increasing the efficiency of adsorbents.

In processes for adsorbing substances from liquids in which such substances are present in true solutions, the adsorbent employed is usually substantially above colloidal dimensions. When the adsorbent is in a state of very fine subdivision, the individual particles are usually enveloped in an air film, that is, their surface is covered with an adsorbed air film. This condition may be identified by tilting a bottle partially filled with such a finely subdivided adsorbent. It will be noted that the adsorbent flows in wave-like billows, this property being due to the adsorbed air films which form an air cushion between the individual particles of the adsorbent. In the use of such adsorbents, their efficiency is materially retarded due to the envelopment of the particles thereof in air films. When such an adsorbent is introduced into a liquid for the purpose of adsorbing substances therefrom, the air film on the individual particles of the adsorbent must be dissolved in the liquid before adsorption will occur. The air films carried by the particles of the adsorbent are very slowly dissolved, and, therefore, the desired adsorption is correspondingly retarded.

It is an object of the present invention to so treat the adsorbent material as to remove from the particles thereof the enveloping air films and to thus render all of the adsorbent material immediately available for the adsorption of materials desired to be removed from the liquid treated.

It is a more specific object of the invention to subject the finely divided adsorbent while in a water carrier to mechanical forces which will effectively remove the air films from the particles.

It is a further object of the invention to effect the treatment of the adsorbent material in combination with a process for adsorbing organic or like matter from a liquid so that the treated adsorbent may be immediately utilized before the particles thereof have an opportunity to again take on air films.

In the accompanying drawing there is illustrated one form of apparatus by which the process may be effected, and in connection with which the process will be described.

In the drawing,—

Figure 1 is a view in side elevation of an apparatus suitable for practicing the invention; and Figure 2 is a detailed sectional view thereof.

One adsorbent which has been successfully treated in accordance with the invention is the waste dust produced in the manufacture of cement. These waste dusts are very good adsorbents and are especially well adapted for the adsorption of organic matter present in true solution in water. Such adsorbent dusts will pass through a 200 mesh screen and are thus very fine.

The affinity of the particles of the adsorbent for the molecules of oxygen and nitrogen of the air is purely physical and can be overcome and the films disrupted by the application of mechanical forces which I term "shearing forces." These shearing forces may be applied in a device analogous to a colloid mill. Such device is generally illustrated in the drawing at 1. The mill has a suitable hopper or bowl 2, into which the adsorbent in a water carrier is adapted to be introduced.

The water carrier is used in an amount such that each one cubic centimeter of a solution leaving the mill will carry about .02 gram of the adsorbent.

The mill 1 is provided with a stator 3 and a rotor 4 having cooperating conical faces 5 and 6 respectively. Below the conical faces 5 and 6 the mill is provided with an outlet conduit 7. The adsorbent in the water carrier passes between the conical faces 5 and 6 which have been previously set so that the particles can just pass therebetween without any further grinding or disintegrating action. The slope of the rotor may be approximately 45°. Due to this slope there is a considerable difference in peripheral speed at the small and the large ends of the rotor. As the material travels from the small end of the rotor toward the larger discharge end, the speed of travel increases rapidly, resulting in the so-called "shearing" action. The passage of the adsorbent through the mill frees the particles thereof of their adsorbed air films. From the mill the adsorbent discharges through the outlet 7 controlled by a suitable valve mechanism 8, and is admitted without re-exposure to the atmosphere through the line 9 into the line 10. The liquid into which the adsorbent is to be introduced is flowed through the line 10 so that the adsorbent in the water carrier is directly admitted to the liquid to be treated.

The liquid to which the treated adsorbent has been introduced may be passed into a suitable tank 11 for subsequent agitation and coagulation of the adsorbent carrying adsorbed material. Such subsequent treatment may be effected in the tank 11 or a liquid containing the adsorbent may be drawn off through the line 12 controlled by suitable valve 13 and treated elsewhere.

In actual tests carried out with the invention in connection with the adsorbing of organic matter present in true solution in water, it was demonstrated that .075 gram of the adsorbent material treated in accordance with the invention effected the same degree of adsorption in a five minute time period as did a .250 gram of untreated adsorbent. The rate of adsorption by the treated adsorbent is far in excess of that of the untreated adsorbent. In fact a 100% greater degree of adsorption was effected in one minute by the treated adsorbent than in five minutes by the same amount of untreated adsorbent.

The foregoing description is merely illustrative and is not to be construed in a limited sense.

Having thus described my invention, what I claim is:—

1. A method for increasing the efficiency of solid adsorbent materials in a state of fine subdivision the particles of which are enveloped in air films comprising passing the adsorbent material in a liquid carrier through a shearing mill, the rotor and stator of which have been previously adjusted to the exact particle size of the adsorbent material.

2. In a method for adsorbing material from a liquid with a solid adsorbent in a state of fine subdivision the particles of which carry adsorbed air films, the step of subjecting the adsorbent material in a liquid carrier to forces adequate to shear the adsorbed air films from the particles thereof and thereupon introducing the adsorbent material, without removal from the liquid carrier, to the liquid containing the material to be adsorbed.

OLIVER M. URBAIN.